United States Patent
Looby et al.

[11] 3,921,329
[45] Nov. 25, 1975

[54] FISHING ROD HOLDER

[76] Inventors: James J. Looby; Michael J. Looby, both of 107 Silverview Court, Vallejo, Calif. 94590

[22] Filed: Feb. 24, 1975

[21] Appl. No.: 552,470

[52] U.S. Cl. .................................. 43/21.2; 248/42
[51] Int. Cl.² ......................................... A01K 97/10
[58] Field of Search .......... 43/21.2, 17, 16; 248/42, 248/44

[56] References Cited
UNITED STATES PATENTS

| | | | |
|---|---|---|---|
| 2,211,278 | 8/1940 | LeFebvre | 43/21.2 |
| 2,555,982 | 6/1951 | Mart | 43/21.2 |
| 2,573,635 | 10/1951 | Williams | 248/42 |
| 2,680,924 | 6/1954 | Menegay | 43/21.2 |

*Primary Examiner*—Warner H. Camp
*Attorney, Agent, or Firm*—Townsend and Townsend

[57] ABSTRACT

A holder for a fishing rod/reel device of the type having a handle portion which includes an integral reel and a rod portion adapted to fold outward from the handle portion is disclosed. The handle portion of such a device is ordinarily provided with a slit for mounting the device on the belt of a fisherman for carrying of the device when it is not in use. The holder of the present invention includes a shaft having a pointed end which can be stuck into the ground to mount the shaft vertically. An upwardly opening padded cradle is fixed to the top of the shaft and is adapted to receive and support the forward end of the handle portion of the rod/reel device. A tab projects rearwardly from the shaft and has a padded free end adapted to be inserted into the slit in the handle portion of the rod/reel device. The thickness of the free end of the tab is preselected so that the tab is press fit into the slit to prevent sliding of the rod/reel device when supported by the cradle.

5 Claims, 3 Drawing Figures

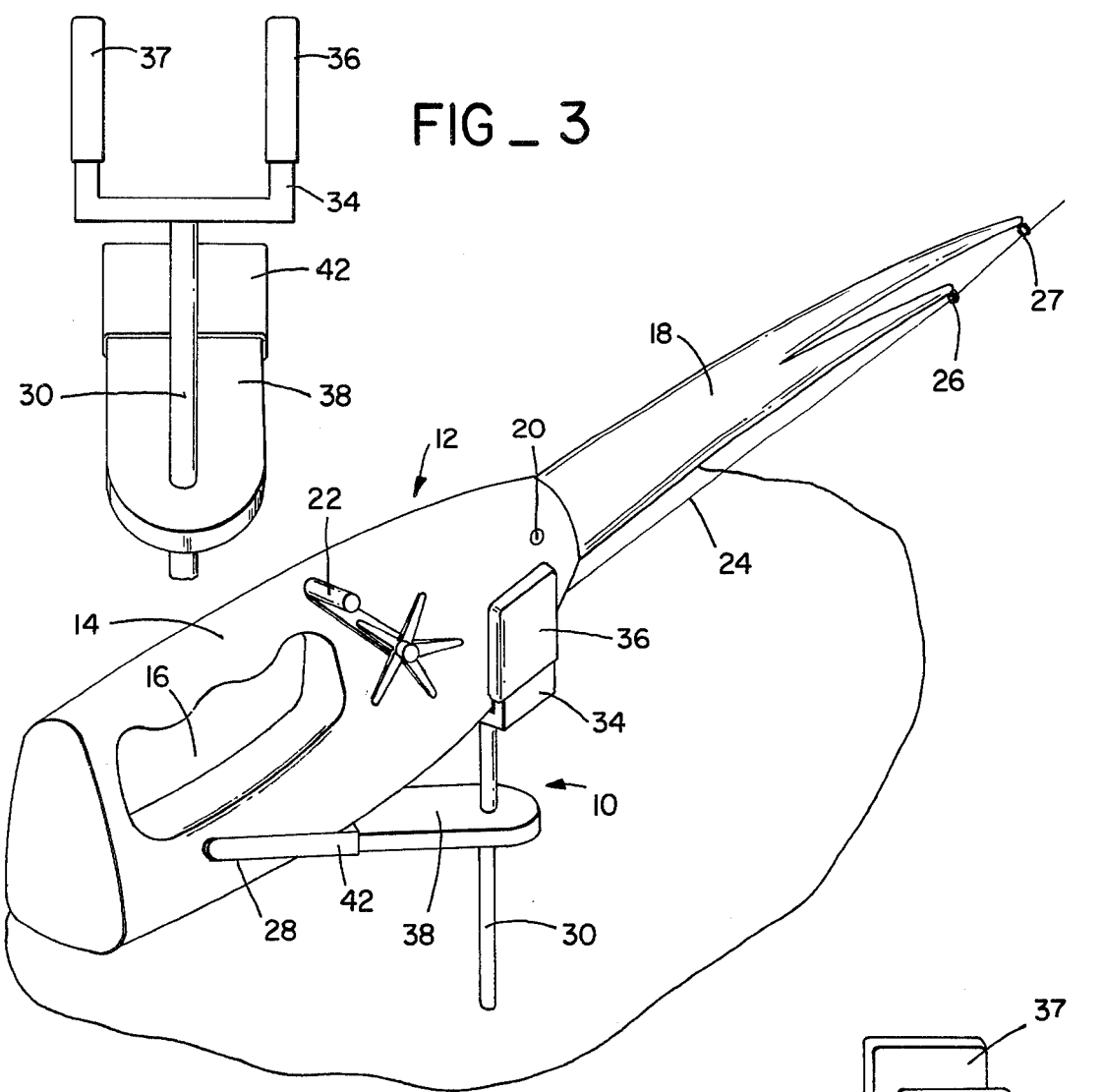
FIG_3
FIG_1
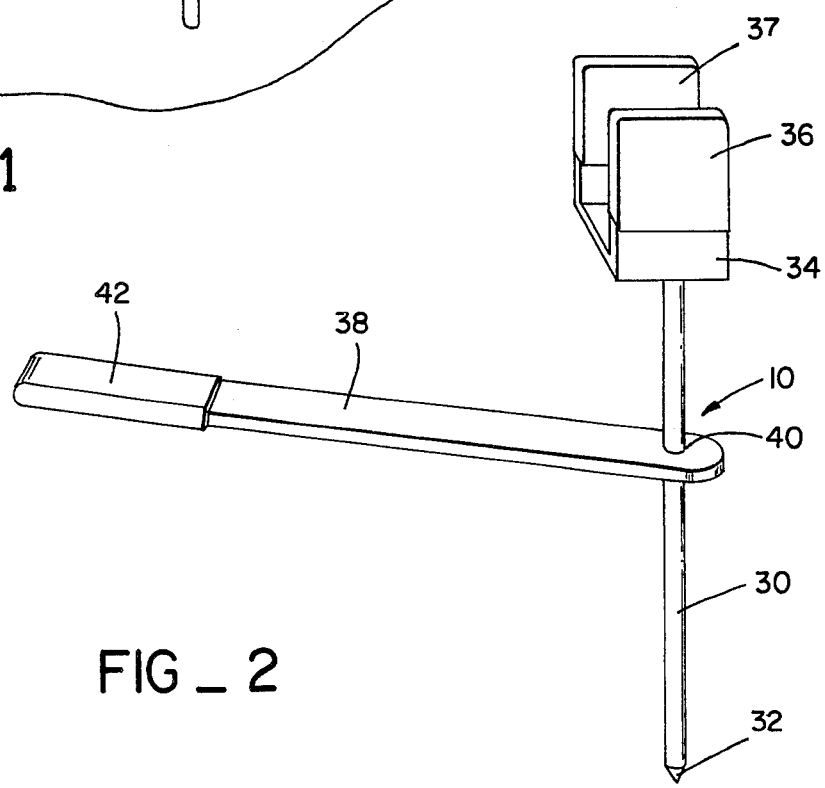
FIG_2

FISHING ROD HOLDER

BACKGROUND OF THE INVENTION

The present invention relates to a holder for a fishing rod/reel device which has a handle portion including an integral reel and a rod portion adapted to fold outward from the handle portion.

One of the annoyances of fishing, particularly when the fish are not biting rapidly, is holding the rod in one's hand for long periods of time while waiting for a fish to bite. A variety of devices have been developed and are illustrated in the prior art for supporting fishing rods so that they need not be held by the user except when a fish is being landed. Such devices have been found to be quite useful and they are often installed on boats or adapted to be mounted in the ground for the convenience of the fisherman.

The devices found in the prior art for supporting a fishing rod usually include a cradle, and a locking mechanism for preventing the rod from sliding backwardly through the cradle. The locking mechanism may not prevent the rod from sliding forwardly, and as a result, there is a possibility that the rod can be pulled forwardly through the cradle and out of the device when a fish strikes, thus losing the rod and reel as well as the fish. Also, when the fisherman takes the rod out of the device after a fish has struck the lure, he must ordinarily move it forwardly out of the cradle to disengage the locking mechanism. Such forward movement of the rod can cause slack in the line, and as a result of such slack, the fish often becomes disengaged from the lure and is lost.

Recently, a new device has been developed which combines the functions of both rod and reel. Such devices include a handle with an integral reel, and a relatively short rod which folds out from the handle. Such devices have a relatively wide handle with an interior aperture to provide a handhold, rather than the narrow elongate handles found on ordinary fishing rods. Part of the purpose of the wide handle is to accommodate the integral reel, and it also serves to provide a more convenient handhold for the user. The difficulty with such rod/reel devices is that they cannot be mounted on fishing rod holders found in the prior art.

SUMMARY OF THE INVENTION

The present invention provides a holder for a fishing rod/reel device of the type having a handle portion which includes an integral reel and a rod portion adapted to fold outward from the handle portion. The handle portion of such a device is ordinarily provided with a slit for mounting the device on the belt of a fisherman for carrying of the device when it is not in use. The holder of the present invention includes a shaft having a pointed end which can be stuck into the ground to mount the shaft vertically. An upwardly opening cradle is fixed to the top of the shaft and is adapted to receive and support the forward end of the handle portion of the rod/reel device. A tab projects rearwardly from the shaft and has a free end adapted to be inserted into the slit in the handle portion of the rod/reel device. The thickness of the free end of the tab is preselected so that the tab is press fit into the slit to prevent sliding of the rod/reel device when supported by the cradle.

The holder of the present invention is readily adaptable to the new type of rod/reel devices where the reel is integral to the handle. The holder can easily be stuck into the ground, and the rod/reel device quickly mounted to the holder. When a fish strikes the lure emanating from the device, the device will be pulled forwardly and further engage the tab and will not be pulled out of the holder. The rod/reel device can quickly be snapped off the holder by pulling backwardly on the handle to disengage it from the tab. Since the handle is pulled backwardly, no slack is introduced into the line leading to the lure and the possibility that the fish will be lost is minimized.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition for the limits of the invention.

BRIEF DESCRIPTION OF THE DRAWINGS

FIG. 1 is a perspective view of a fishing rod/reel device supported by the holder of the present invention;

FIG. 2 is a perspective view of the holder of the present invention;

FIG. 3 is a front elevation view of the holder of the present invention.

DESCRIPTION OF THE PREFERRED EMBODIMENT

The holder 10 of the present invention is adapted to support a rod/reel device 12 as illustrated in FIG. 1. Such rod/reel devices include a handle portion 14 having an aperture 16 which provides a hand grip for the fisherman, and a relatively short rod portion 18 pivotably attached to the handle portion at 20. Rod portion 18 is approximately the same length as handle portion 14, and is adapted to pivot about point 20 to fold together with the handle portion for storage.

As illustrated in FIG. 1. the rod portion 18 is folded out from handle portion 14 for use of rod/reel device 12. Handle portion 14 has a relatively wide transverse dimension in order to accommodate an integral reel controlled by handle 22. A fishing line 24 emanates from the integral reel in handle portion 14 and passes through eyes 26, 27 at the tip of rod portion 18 and on to a fishing lure (not shown). The handle portion 14 of rod/reel device 12 is provided with a slit 28 at the underside thereof. The primary purpose of slit 28 is to allow the rod/reel device to be carried on the belt of the fisherman when not in use.

As illustrated by way of reference to FIGS. 1–3 in combination, the holder 10 of the present invention includes a shaft 30, the lower end 32 of which is pointed so that the shaft can be stuck in the ground for mounting it in a substantially vertical configuration. A generally U-shaped cradle 34 is mounted to the top of shaft 30. A pair of pads 36, 37 are slipped over the upraised end of cradle 34 to prevent scratching of rod/reel device 12 when placed therein.

A rearwardly extending tab 38 has one end 40 fixed to shaft 30 and an opposite free end covered by a pad 42. Pad 42 is made of resilient deformable material having a thickness slightly greater than the width of slot 28. Thus, when pad 42 is inserted in slot 28, material 42 is press fit in the slot and prevents sliding of rod/reel device 12 with respect to cradle 34.

In operation, holder 10 is mounted in position by sticking the lower pointed end 32 of shaft 30 into the ground. After a fishing lure has been cast using rod/reel device 12, it can be placed in the holder by locating the forward end of handle portion 14 in cradle 34, and slipping the slit 28 over the padded end 42 of tab 38. Since tab 38 is press fit within slit 28, the rod/reel device is secured in position.

If a fish strikes the lure when rod/reel device 12 is mounted on holder 10, the initial force on the rod/reel device will be in a forward direction. Since tab 38 projects rearwardly into slot 28, the forward force on the rod/reel device will not cause it to become disengaged from the device. When the fisherman grabs the rod/reel device to reel in the fish, the rod/reel device is disengaged from the holder by moving it backwardly with respect to the holder so that no slack is introduced in the line, which can cause the fish to be lost. When the fisherman desires to move to a new location, he need only pull upwardly on holder 10 to disengage it from the ground for remounting in the new location.

While a preferred embodiment of the present invention has been illustrated in detail, it is apparent that modifications and adaptations of that embodiment will occur to those skilled in the art. For example, the shape of the cradle need not be generally U-shaped as illustrated, but could take various forms and still support the forward end of the handle portion of the rod/reel device. However, it is to be expressly understood that such modifications and adaptations are within the spirit and scope of the present invention, as set forth in the following claims.

What we claim as new is:

1. A holder for a rod/reel device having a handle portion including an integral reel and a rod portion adapted to fold outward from the handle portion, the handle portion of the device being provided with a slit for mounting the device on the belt of a fisherman for carrying of the device when not in use, said holder comprising:
   a shaft having a pointed end adapted to be inserted into the ground for mounting the shaft in a substantially vertical configuration;
   an upwardly opening cradle fixed to the end of the shaft opposite from the pointed end and adapted to receive and support the forward end of the handle portion of the rod/reel device; and
   a rearwardly projecting tab having one end fixed to the shaft and an opposite free end adapted to be inserted into the slit in the handle portion of the rod/reel device, the thickness of the free end of the tab being preselected so that said free end is press fit into the slit to prevent sliding of the rod/reel device with respect to the cradle when placed thereupon.

2. A holder as recited in claim 1 wherein the free end of the tab has a resilient covering to secure the tab to the slit when the tab is press fit therein.

3. A holder as recited in claim 1 wherein the cradle has a generally U-shaped cross section.

4. A holder as recited in claim 3 wherein the upper edges of the U-shaped cradle are padded to prevent damage to the rod/reel device when inserted therein.

5. A holder for a rod/reel device having a handle portion including an integral reel and a rod portion adapted to fold outward from the handle portion, the handle portion of the device being provided with a slit for mounting the device on the belt of a fisherman for carrying of the device when not in use, said holder comprising:
   a shaft having a pointed end adapted to be inserted into the ground for mounting the shaft in a substantially vertical configuration;
   an upwardly opening, generally U-shaped cradle fixed to the end of the shaft opposite from the pointed end and adapted to receive and support the forward end of the handle portion of the rod/reel device, the upper edges of the U-shaped cradle being padded to prevent damage to the rod/reel device when inserted therein; and
   a rearwardly projecting tab having one end fixed to the shaft and an opposite free end adapted to be inserted into the slit in the handle portion of the rod/reel device, the free end of said tab having a partially resilient covering having a preselected thickness so that the padded free end of the tab is press fit into the slit to prevent sliding of the rod/reel device with respect to the cradle when placed thereupon.

\* \* \* \* \*